July 24, 1956  E. C. KIEKHAEFER  2,755,826
TRANSMISSION CASE FOR POWER CHAIN SAW
Filed July 30, 1952  4 Sheets-Sheet 1
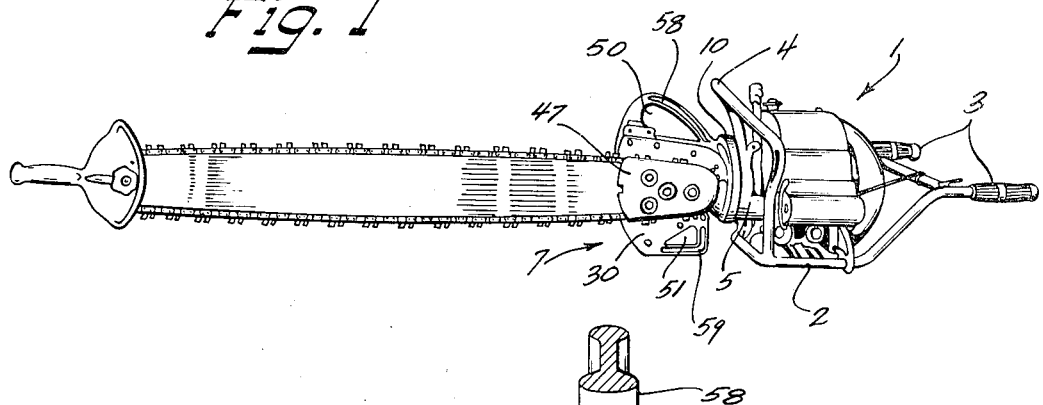
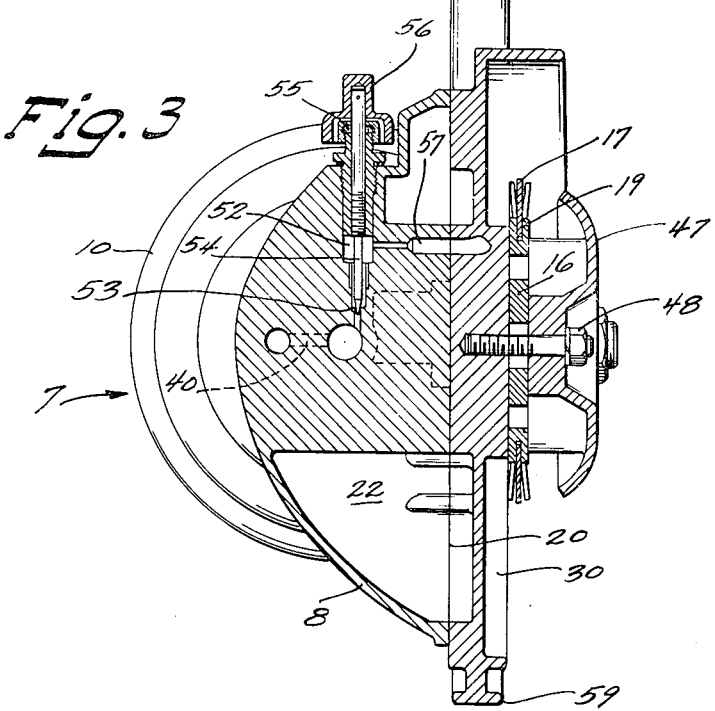
INVENTOR.
Elmer C. Kiekhaefer
BY
Andrus & Sceales
Attorneys July 24, 1956     E. C. KIEKHAEFER     2,755,826
TRANSMISSION CASE FOR POWER CHAIN SAW Filed July 30, 1952     4 Sheets-Sheet 2

INVENTOR.
Elmer C. Kiekhaefer
BY
Andrus & Scales
Attorneys

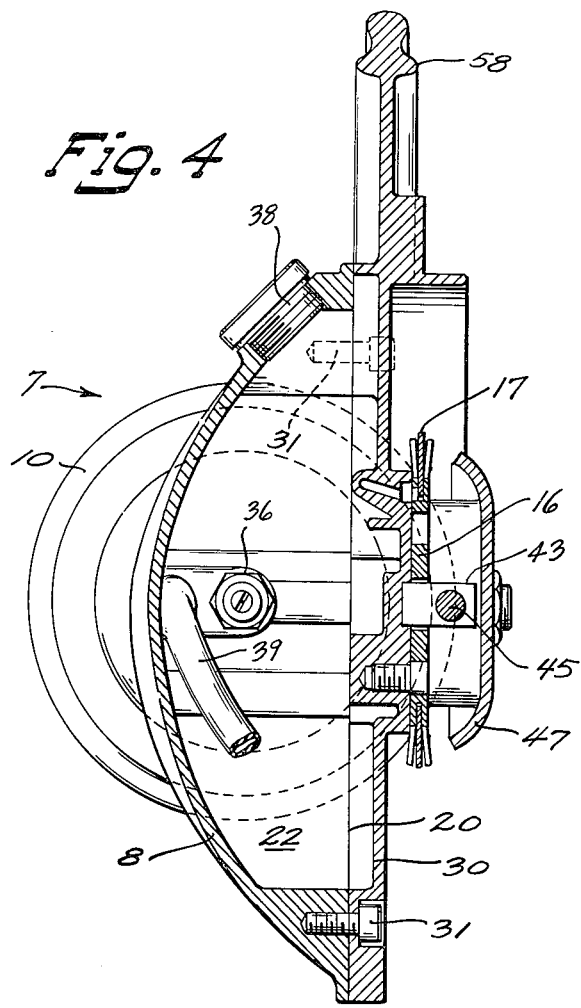
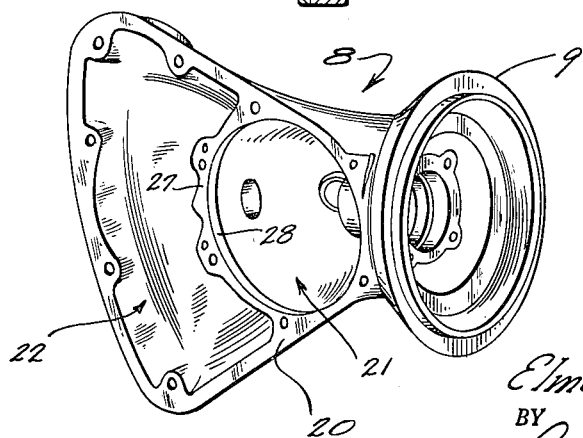

July 24, 1956  E. C. KIEKHAEFER  2,755,826
TRANSMISSION CASE FOR POWER CHAIN SAW
Filed July 30, 1952  4 Sheets-Sheet 4

INVENTOR.
Elmer C. Kiekhaefer
BY
Andrus & Sceales
Attorneys

United States Patent Office 2,755,826
Patented July 24, 1956

2,755,826
TRANSMISSION CASE FOR POWER CHAIN SAW

Elmer C. Kiekhaefer, Cedarburg, Wis.

Application July 30, 1952, Serial No. 301,702

2 Claims. (Cl. 143—32)

This invention relates to chain saws and particularly to the construction of the transmission unit which is adjustably secured to the crankcase of the chain saw engine and which supports the guide rail of the chain.

The invention provides a transmission case comprising a shell having a number of recesses opening at one side thereof and a lightweight, drop-forged plate bolted thereto to close the recesses and support the sprocket shaft and guide rail. The plate has a portion overlying the transmission case shell with openings therein to provide reinforced handle means for the manipulation of the unit and the adjustment of the transmission case.

An object of the invention is to simplify the construction of the transmission unit to provide a lighter weight, and more easily assembled transmission case.

Another object is to provide a more rugged abutment plate adapted to carry the cutting force of the chain.

Another object is to provide a chain saw unit for more rugged service and of lighter weight.

Another object is to support the sprocket shaft in direct relation to the abutment plate.

These and other objects and advantages will be set forth in the description of an embodiment of the invention as illustrated in the accompanying drawings.

In the drawings:

Figure 1 is a perspective view of the chain saw unit showing the engine and the guide rail carrying the saw chain and secured to the engine by the transmission case;

Fig. 3 is a vertical transverse section taken on lines 3—3 of Figure 2;

Fig. 4 is a vertical transverse section taken on lines 4—4 of Fig. 3;

Fig. 5 is a perspective view of the transmission case shell with cover and other parts removed.

Figure 2:
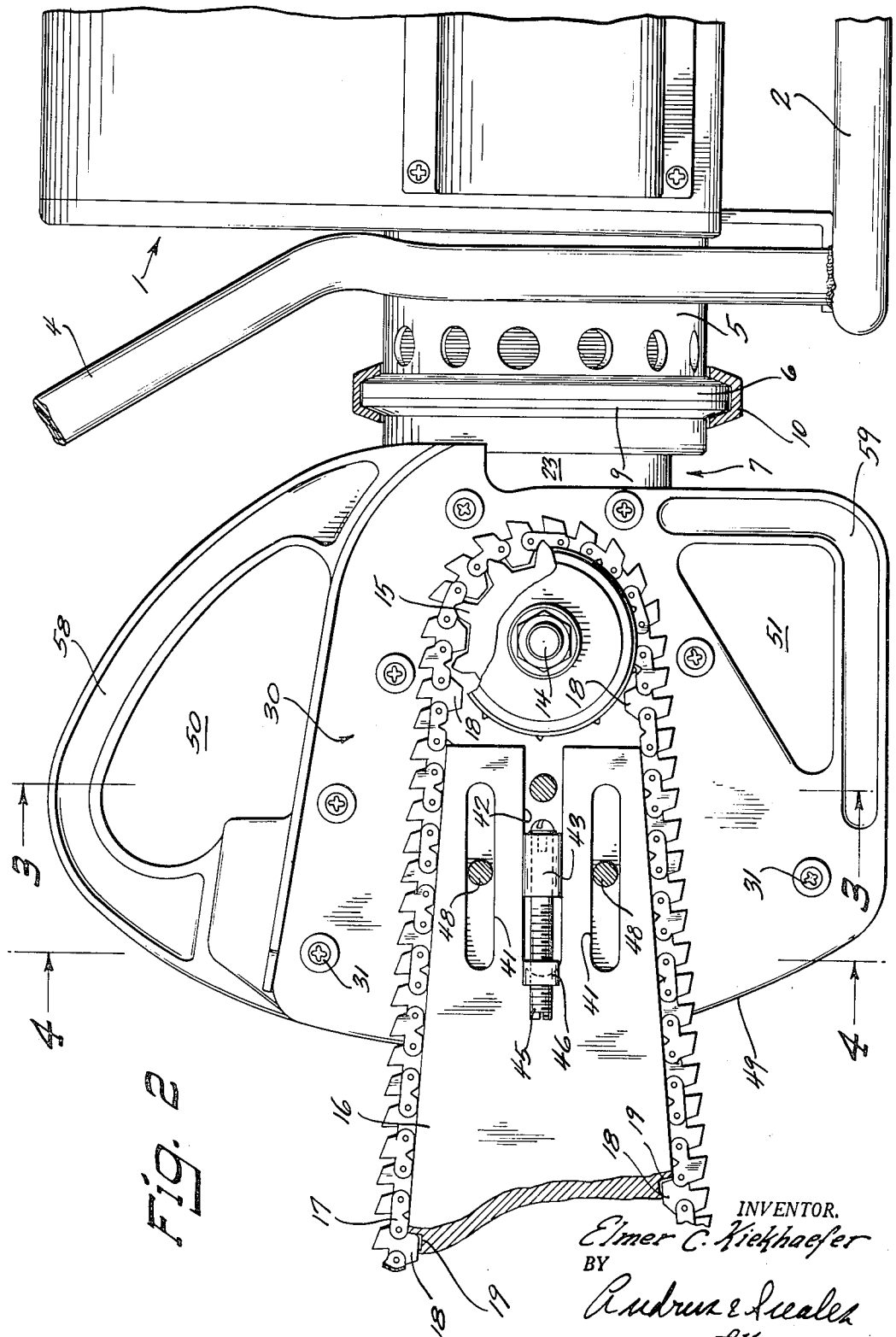
Fig. 2 is a side elevation of the transmission case.
Figure 6:
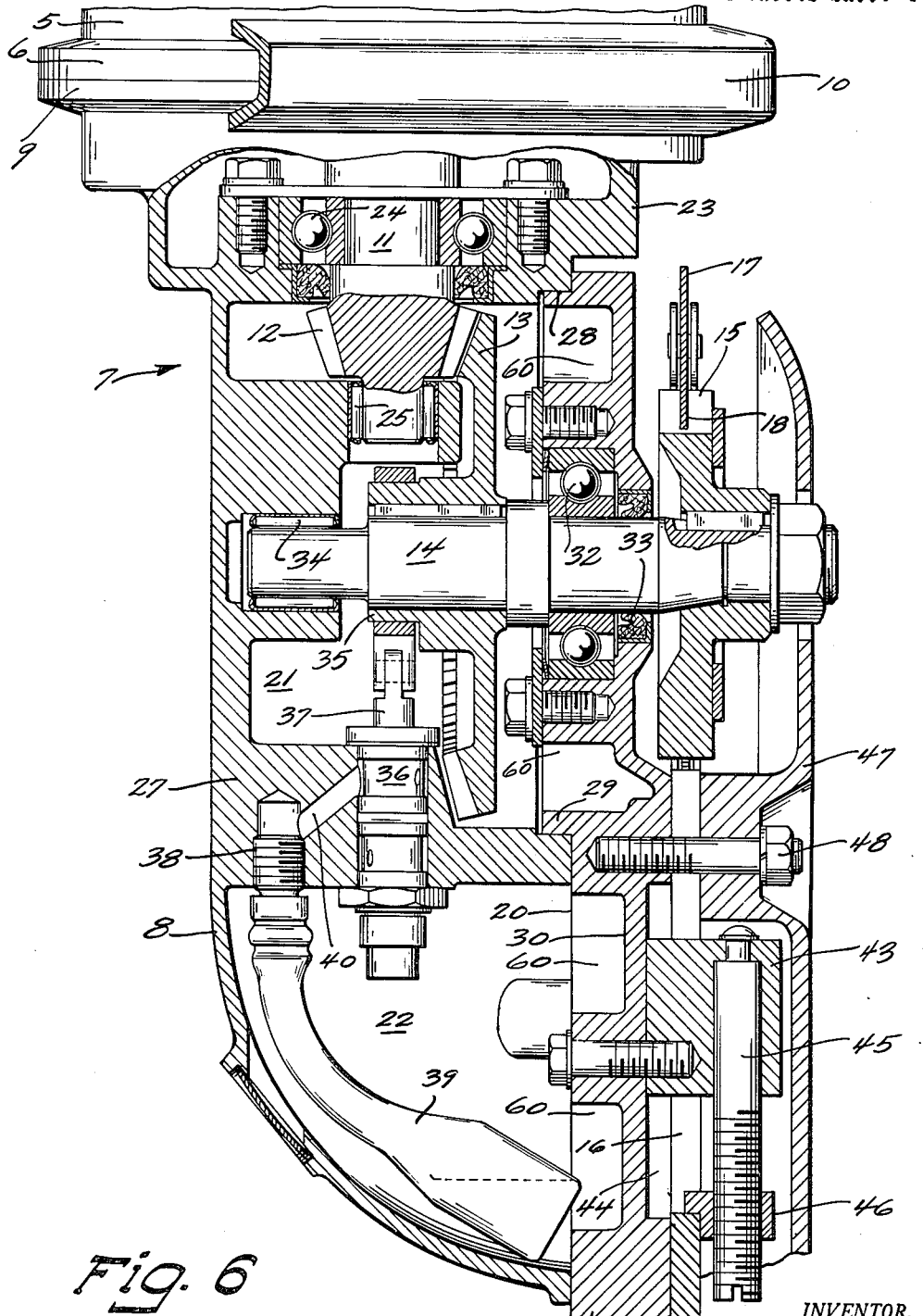
Fig. 6 is an enlarged horizontal transverse section through the transmission case taken on the axis of the sprocket shaft which drives the chain.

The chain saw unit shown in the drawings includes the engine 1 mounted on the tubular frame 2 which extends beneath the engine and includes the two handles 3 extending rearwardly of the unit. The forward tubular handle 4 extends from frame 2 over the forward end of the cranckcase 5 of engine 1. The forward annular flange 6 of crankcase 5 supports the transmission case 7 for relative rotational adjustment on the longitudinal axis of the unit.

Transmission case 7 includes the shell member 8 which is formed at one end thereof with the circular flange 9 corresponding to flange 6 and is adapted to be secured thereto. The ring clamp 10 is of U-shaped section to fit over and join flanges 6 and 9. The adjustment of ring clamp 10 by tension means, not shown, provides for the firm and rigid securement of the transmission case 7 to engine 1 or by loosening clamp 10 for the selective rotational adjustment of transmission case relative to engine 1 on the axis referred to. The shaft 11 carried by member 8 on the same axis is adapted to be driven by connection with the crankshaft, not shown, of engine 1 in any of said positions of adjustment.

The pinion 12 formed near the end of shaft 11 meshes with the larger beveled gear 13 to drive the shaft 14 carrying the sprocket 15. Shaft 14 is disposed at right angles to the axis of shaft 11. The chain guide rail 16 is carried by transmission case 7 as will be described with one end thereof adjacent to sprocket 15 which carries the chain 17. Chain 17 is trained over sprocket 15 which drives the chain around the edge of the rail and includes a series of links having lower guides 18 which move in the groove 19 of the rail.

Member 8 comprises preferably a cast, unitary shell having the planiform face 20 which is parallel to and offset from the axis of shaft 11 and is provided with the adjacent recesses 21 and 22 which open laterally from face 20 of member 8.

Recess 21 is generally circular in outline and is adjacent to the closed rear end 23 of the shell which carries the bearing unit 24. Bearing unit 24 supports shaft 11 intermediate the ends thereof. The forward end of shaft 11 and pinion 12 thereof is supported in recess 21 by the roller bearing unit 25 which is mounted in a projecting wall formed within the chamber.

The generally circular wall 27 formed in shell member 8 separates recesses 21 and 22. Wall 27 is formed with the stepped bore 28 in the open end of recess 21 adjacent to face 20 of member 8 to receive the circular boss 29 of the plate 30 which is secured by the bolts 31 to shell 8 to close the latter and carry and support sprocket shaft 14 and guide rail 16. The plate 30 carries the ball bearing unit 32 supporting shaft 14 which projects through the opening in plate 30 at the center of boss 29 and carries sprocket 15 on the outside thereof. The seal 33 closes the opening provided for shaft 14 and is located on the outer side of plate 30 oppositely of boss 29.

The roller bearing unit 34 in the inner wall of recess 21 carries the inner end of shaft 14 adjacent to the cam 35 formed in the hub of gear 13. The cylinder 36 secured in wall 27 of member 8 carries the plunger 37 which is connected to collar 38 mounted on cam 35 for reciprocation of plunger 36 with rotation of shaft 14 with operation of the saw.

Member 8 is provided with the threaded opening 38 and closure therefor for filling chamber 22 with a chain lubricant which is delivered to cylinder 36 by the flexible tube pick-up 39 mounted at one end in wall 27 and the passage 40 therein from pick-up 39 to the cylinder.

The guide rail 16 comprises a single plate of high-speed steel having the groove 19 to receive the chain 17 and guide the chain along and around the outer, free end of the rail. The opposite end of rail 16 is secured to the outer face of plate 30 forwardly of sprocket 15 and is provided with the two parallel slots 41 and the intermediate slot 42 which latter opens from the end of the rail adjacent to sprocket 15. The guide block 43 carried by plate 30 fits within slot 44 thereof to prevent relative planar movement of the plate and guide rail 16 and projects through the slot to carry the tension adjustment screw 45 which is seated at one end within the block. The movable block 46 threaded on screw 45 is fitted with a projecting portion which engages the forward end of slot 44 and is adapted to move guide rail 16 away from sprocket 15 to tighten chain 17 or to be withdrawn toward the sprocket and allow the guide rail to be moved sufficiently to allow removal of the chain therefrom. The cover 47 is secured to plate 30 by the bolts 48 extending from the plate through slots 41 in the guide rail and is adapted to be firmly tightened toward plate 30 with the end of guide rail 16 firmly secured therebetween.

According to the invention, plate 30, secured to shell member 8 by the bolts 31, comprises a generally flat member having a reinforced outer periphery and overlies the planiform face 20 of member 8 to provide forwardly thereof and adjacent to chain 17, the abutment 49 to engage the work being cut by the chain and to carry the thrust of the chain in the opposite direction of cutting movement. The flat plate 30 is adapted to be formed of a single drop-forged aluminum piece to provide the desired strength with a minimum weight to support the guide rail 16 and bearing 32 carrying shaft 14 and sprocket 15. The removal of plate 30 provides access to recesses 21 and 22 and the adjustment of the operating parts within the transmission case.

According further to the invention, plate 30 projects over member 8 or overlies the upper and lower parts thereof and is provided with the openings 50 and 51. The openings 50 and 51 are located in plate 30 above and below member 8 to provide handle means adapted to be grasped to turn the transmission case on the axis of shaft 11 for the adjustment of guide rail 16 as described, and in the operation of the unit for the manipulation of the unit as desired.

The delivery of chain lubricant from cylinder 36 is controlled and provided by the vertical bore 52 in wall 27 which is fitted with the valve seat 53 controlled by the needle 54 threaded in the upper end of bore passage 52. The packing member 55 beneath control handle 56 closes the upper end of passage 52.

The passage 57 in member 8 and plate 30 extends from bore 52 in member 8 and opens at the opposite side of plate 30 to communicate with groove 19 of the chain guide rail to deliver the lubricant thereto.

The upper and lower handles 58 and 59 of plate 30 extend generally from front to rear of the transmission case 7 and serve to reinforce plate 30 thereof, thereby allowing plate 30 to be provided with the series of lightening recesses 60 which materially reduce the weight of the case.

Member 8 comprises a shell supported by bolts 31 at the perimeter thereof to provide a rigid lightweight structure for supporting the guide rail 16 and shafts 11 and 14 and handles 58 and 59 serve to reinforce plate 30 and protect the same and member 8 against damage.

Various embodiments of the invention may be employed within the scope of the following claims.

I claim:

1. In an engine-driven chain saw unit having a sprocket shaft and a chain guide rail, a transmission case comprising a lightweight shell having one end adapted to be removably secured to the engine with the other end to extend in the direction of the work, said shell having chambers opening to one side thereof and a planiform face defining said side and extending around the openings of said chambers, a shaft bearing formed by said shell in one of said chambers and adapted to receive and support one end of said shaft with its axis normal to said face, a hardened, lightweight plate member secured to said shell about the periphery thereof to support the same against collapse and close said chambers, said plate being adapted to receive and support said shaft through an opening in the plate, adjustable means carried by said plate opposite another of said chambers of said shell and carrying the guide rail to secure the same to said plate, said plate overlying the forward end of said shell to abut the work and having a substantial projecting portion extending from the front to the rear of the shell and overlying the adjacent outer dimensions of said shell and having at least one opening therein to provide handle means extending substantially the length of the shell for manipulation of the transmission case, the inner part of said plate closing said chambers and supporting said shell being of relatively lightweight construction and reinforced about the periphery thereof by said handle means disposed relatively more remote from said shell.

2. In an engine-driven chain-saw unit including a saw-chain and a guide-rail supporting said saw chain, a transmission case comprising a unitary lightweight die-cast shell having a rear part for securement to the engine of the unit and a planiform side extending forwardly from said rear part, said shell defining a lubricant chamber in the forward part thereof and a gear chamber intermediate said lubricant chamber and said rear part, said shell having a wall portion separating said chambers and having shaft bearing means in said gear chamber, said chambers opening from said planiform side of the shell, a single reinforced plate secured to said shell to close said chambers and having other shaft bearing means in alignment with said first-named bearing means, a shaft journalled in said bearing means, and a sprocket on said shaft disposed alongside the outer side of said plate adjacent to said gear chamber, said sprocket being driven by the engine to drive the chain, said guide rail having its fixed end secured to the side of said plate adjacent said lubricant chamber and between the forward end of said shell and said wall portion and forwardly of said sprocket, said plate extending forwardly of said shell to provide an abutment for the work and to protect the shell, said plate having substantial portions overlying the shell and having an opening therein to provide handle means extending from the front to said rear part of the shell, said shell and plate being individually unitary members and cooperating to provide the rigid support of said guide rail.

References Cited in the file of this patent

UNITED STATES PATENTS

| | | |
|---|---|---|
| 2,327,962 | Drake | Aug. 24, 1943 |
| 2,348,612 | Deacon | May 9, 1944 |
| 2,370,556 | Mall | Feb. 27, 1945 |
| 2,409,775 | Mall | Oct. 22, 1946 |
| 2,454,868 | Gibson et al. | Nov. 30, 1948 |

OTHER REFERENCES

Mall Catalog Form #2185–6–50, April 23, 1951.